United States Patent [19]

Han

[11] Patent Number: 4,461,174

[45] Date of Patent: Jul. 24, 1984

[54] VANE WHEEL WATER METER

[75] Inventor: Eui M. Han, Seoul, Rep. of Korea

[73] Assignee: Shinhan Kongki Co., Ltd., Incheon, Rep. of Korea

[21] Appl. No.: 396,014

[22] Filed: Jul. 7, 1982

[30] Foreign Application Priority Data

Jul. 16, 1981 [KR] Rep. of Korea .......... 1981-5053[U]
Mar. 23, 1982 [KR] Rep. of Korea .......... 1982-2215[U]

[51] Int. Cl.³ .............................................. G01F 1/07
[52] U.S. Cl. ................................. 73/275; 73/861.87; 73/861.88
[58] Field of Search ............... 73/275, 861.87, 861.79, 73/861.88, 189

[56] References Cited

U.S. PATENT DOCUMENTS 440,559  11/1890  Glad .................................... 73/275
806,961  12/1905  Drake ................................... 73/275
1,001,722  8/1911  Wilcox et al. ......................... 73/275

Primary Examiner—Donald O. Woodiel
Attorney, Agent, or Firm—Goodman & Teitelbaum

[57] ABSTRACT

A vane wheel water meter having a vane wheel disposed in a vane chamber located between an inlet and an outlet with the meter body being positioned above the vane chamber. The vane wheel has a body with several vanes extending outwardly perpendicular to the vane axis. Stepped back stops are provided on the upper surface of the vane wheel body which gradually incline downwardly in the normal rotational direction of the vane wheel relative to the inlet. Stop pins are mounted within respective cylinders provided in meter body for coacting with the back stops to stop the vane wheel from rotating in the reverse rotational direction. The vane wheel body can be shaped like a truncate cone.

11 Claims, 11 Drawing Figures

VANE WHEEL WATER METER

This invention relates to a vane wheel water meter with back stops for preventing the reversion of the vane wheel of a water meter by an adverse water flow from the outlet into the water meter or by any type of pressure applied thereto.

This invention relates also to a vane wheel which produces its own buoyant force during rotation and is kept afloat.

The prior vane wheel water meters have the disadvantages that said vane wheel can be rotated in the reverse direction by an adverse water flow or by a pressure artificially applied thereto from the outlet during interruption of water supply and accordingly, the normally integrated counts of water amount will be reduced. Therefore, these prior vane wheel the meters can not count the exact amount of water of water supplied. That is to say, the prior vane wheel water meters can not fulfill their functions perfectly because the vane wheel can be easily rotated in the reverse direction to reduce the normal counts already integrated.

The conventional water meters of vane wheel types are usually of solid and simple construction and greatly lighten the users' burden thanks to the low production cost, so that they are particularly suitable for practical use. However in the hilly sections and newly developed areas of a city, the water supplies are often interrupted due to the expansion works of water supply systems. Accordingly, the public waterworks offices are apt to decline the adoption of the prior vane wheel water meters for fear that the measuring counts will be reduced due to an adverse water flow or any other pressures artificially applied thereto during interruption of water supply.

In order to solve the problems mentioned above, I have proposed two kinds of improved water meters of vane wheel type in the Korean Utility Model Applications No. 71-1072 and No. 71-1376. In the former Application No. 71-1072, the outlet side of the vane wheel water meter is provided with a float valve, and in the latter Application No. 71-1376, both outlet and inlet sides of the vane water meter are provided each with a float valve. But in the practical use thereof, it has been found that the float valves themselves and the inside walls of the valve cylinders within which said float valves move up and down are covered with fur and fine materials with the lapse of time, so that the float valves become easily inoperative on one hand. The size of the water meter body becomes greater due to the built-in float valves and precision process and assembly techniques are required for manufacturing said float valves and valve cylinders, which will result in a great increase of the production cost on the other hand.

Furthermore, the conventional vane wheel used in the prior water meter receives the fluid resistance exerted by the water flow running through the vane wheel chamber from the inlet to the outlet whereby said vane wheel is rotated, and the water resistance applied to the vane wheel body is relatively great. Therefore, the shape of the vane wheel body and the inclined angle of the cylindrical surface thereof will greatly affect the rotation of the vane wheel.

The vane wheel body of the prior art is of a cylindrical shape with a uniform diameter and accordingly receives the maximum resistance. Consequently, the bearing pressure applied onto the upper and lower bearing areas will cause a severe friction between the axes of the vane wheel body and the bearing areas on the outlet side which will not only obstruct the smooth rotation of the vane wheel but also cause an early wear of the bearing areas. Accordingly, it is impossible to maintain the axis center, and such an early wear of the bearing areas will result in shortening the life of the water meter.

The object of the present invention is to provide an improved water meter having a novel vane wheel which eliminates said disadvantages of the prior art. The preferred embodiments in accordance with the present invention will now be more particularly described with reference to the accompanying drawings wherein.

Figure 1A:
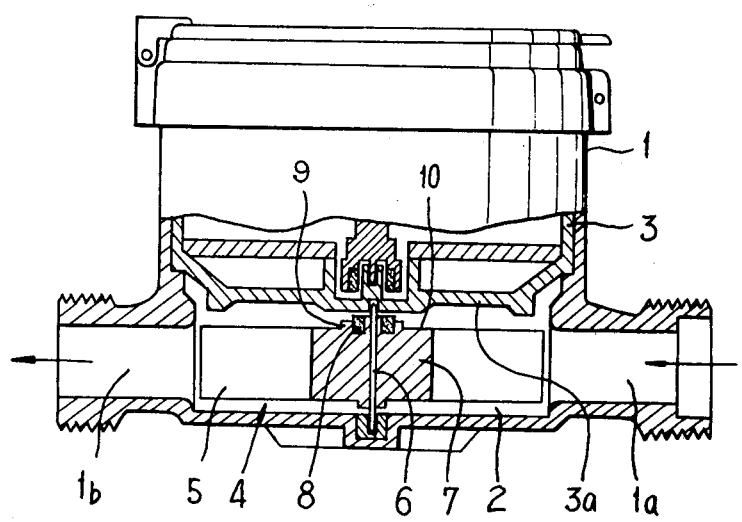
FIG. 1A and 1B are partial sectional views of a vane wheel water meter of the prior art.
Figure 1B:
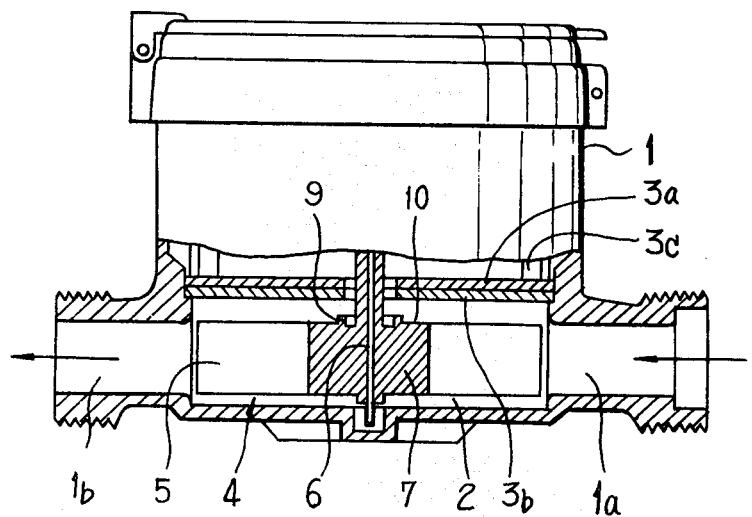

FIGS. 1A and 1B illustrate the respective prior vane wheel water meters of dry and wet types wherein the dry type of the vane wheel water meter as shown in FIG. 1A is composed of a meter body 1, an inlet 1a and an outlet 1b, said inlet 1a and outlet 1b being communicated through a vane chamber 2 located therebetween under said meter body 1, and there is mounted a gear assembly of the water counter in the inner housing 3 located above the vane chamber 2, said gear assembly being driven by a vane wheel 4 rotating within said vane chamber 2 located under the lower plate 3a of said inner housing 3 whereby the water amount is integrated. The wet type of the vane wheel water meter as shown in FIG. 1B has a similar construction as the dry type of the vane wheel water meter wherein the gear assembly of the water counter is mounted between an upper plate serving as a counting scale plate (not shown) and a bottom plate 3a of the meter body 1 located above the vane chamber 2, and the lower end of said gear assembly of the water counter passes through said bottom plate 3a, and a bearing plate 3b is provided under said bottom plate 3a. Between said upper plate and bottom plate 3a, there are provided a plurality of supports 3c required for maintaining the bearing distances of the gear shafts, and the remaining spaces between said supports 3c are left open. Therefore, these types of vane wheel water meters are called wet type which is distinguished from the dry type of FIG. 1A as mentioned above. The vane wheel 4 of the wet type is installed in the same manner as in the dry type water meter.

In the prior vane wheel water meters as described above, the inlet 1a and outlet 1b are located on the opposite sides of said vane chamber 2 respectively. Therefore, if a pressure (water or air flow) is applied to either of the inlet 1a and outlet 1b, the vane wheel 4 can be rotated in either of both directions, that is, clockwise or counter-clockwise.

Consequently, while the vane wheel 4 is rotated by the water flow from the inlet 1a, the amount of water passed therethrough is integrated normally, but if the water supply is interrupted and a counter flow of water or any other type of pressure is applied from the outlet 1b, the vane wheel 4 will be rotated in the reverse direction, so that the normally integrated counts will be reduced.

Figure 2:
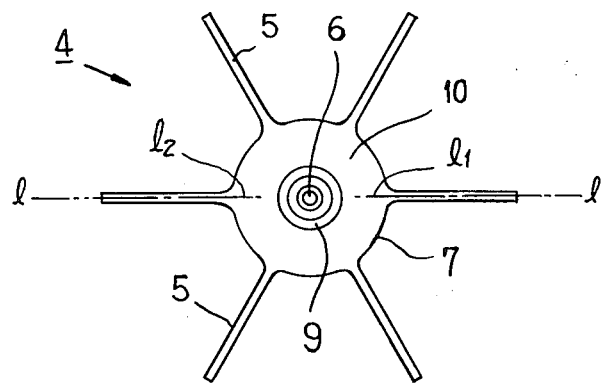
FIG. 2 is a plan view of a vane wheel of the prior vane wheel water meter.

The vane wheel 4, shown in FIG. 2, comprises a vane body 7 having several vanes 5 and an axis 6, and a ring-shaped projection 9 is formed on the center of the upper surface 10 of said vane body 7, said ring-shaped projection 9 accommodating a ferrite magnet 8 inside thereof as shown in FIG. 1a. Said upper surface 10 of the vane body 7 forms a relatively broad annular plane radially extending from the circumference of said ring-shaped projection 9.

Figure 3:
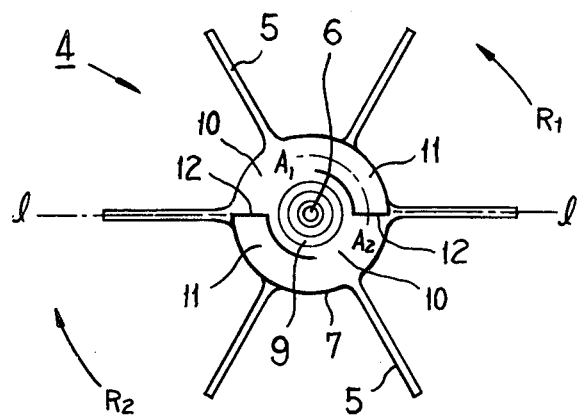
FIG. 3 is an explanatory plan view of a vane wheel provided with the stepped back stops for preventing the reversion of vane wheel in accordance with the present invention.

The mechanism of the present invention for integrating the water amount passed through the water meter is the same as that of the prior art in which the vane wheel 4 is rotated by the water flow running from the inlet 1a, but what differs from the prior art is that the present invention proposes to provide back stops on the upper annular plane 10 of said vane wheel body 7 as shown in FIG. 3 for preventing the reversion of said vane wheel 4 by a counter flow of water or any other pressure applied to the outlet 1b.

Figure 4:
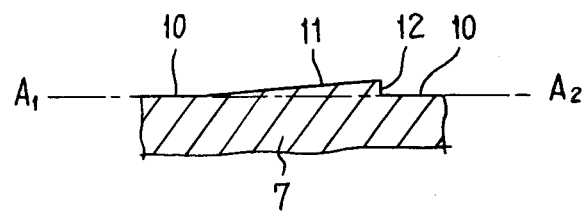
FIG. 4 is an exploded cross-sectional view taken on the line $A_1$—$A_2$ of FIG. 3.
Figure 5:
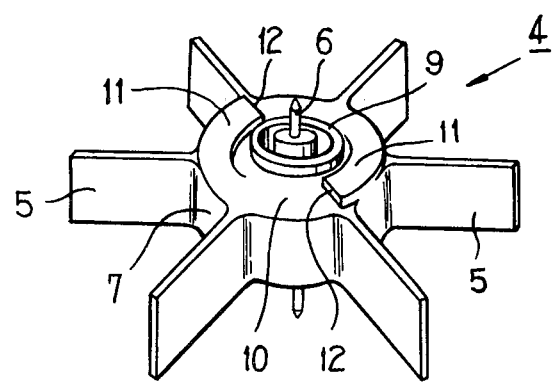
FIG. 5 is a perspective view of the vane wheel in accordance with the present invention.

As shown in FIG. 3, the stepped back stops 12 are formed along the lines $l_1$ and $l_2$, and are declined gradually in the normal rotational direction R1 (counter-clockwise in FIG. 3) of said vane wheel 4 to form inclined planes 11. The cross-sectional view of FIG. 4 taken on the line $A_1$—$A_2$ of FIG. 3 illustrates the inclined planes 11 and the stepped back stops 12. If the vane wheel 4 with said stepped back stops 12 is caused to rotate in the reverse direction R2 (clockwise in FIG. 3) by any adverse pressure applied to the outlet 1b, said stepped back stops 12 will be caught by stop pins 13 as will be explained hereinafter.

Figure 6A:
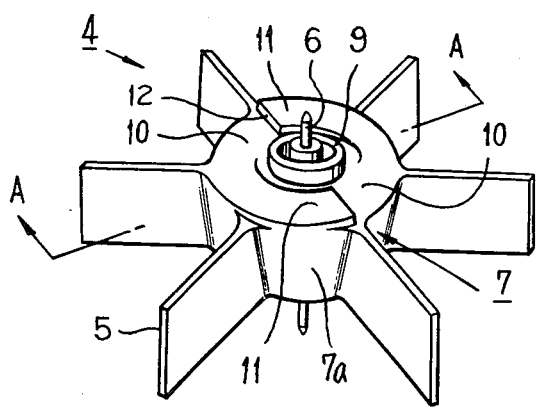
FIGS. 6A, 6B and 6C illustrate another embodiment of the present invention.
Figure 6B:
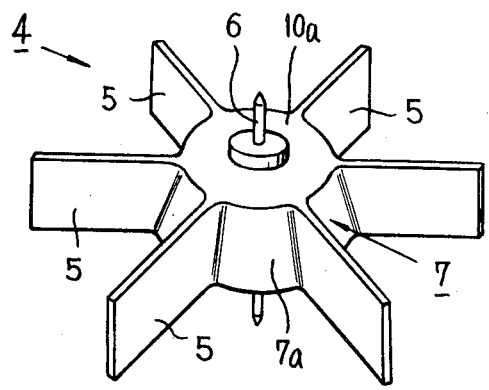
Figure 6C:
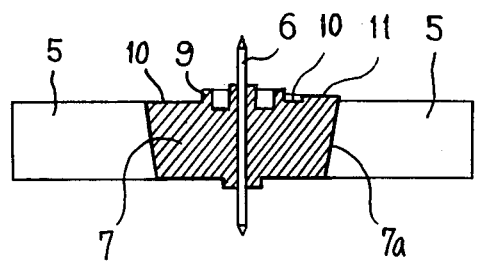

According to another advantageous embodiment of the present invention, the vane wheel body 7 is shaped like a truncate cone which has different diameters of both end-surfaces 10 and 10a as shown in FIGS. 6A and 6B. Furthermore, in shaping said vane wheel body 7, the truncate cone of said body 7 is formed in such manner that the upper plane 10 becomes greater than the lower plane 10a as shown in FIG. 6C so that a plurality of fragmental cylindrical surfaces 7a can be formed around said body 7, each of said fragmental cylindrical surfaces being formed broader in the upward direction.

Figure 7A:
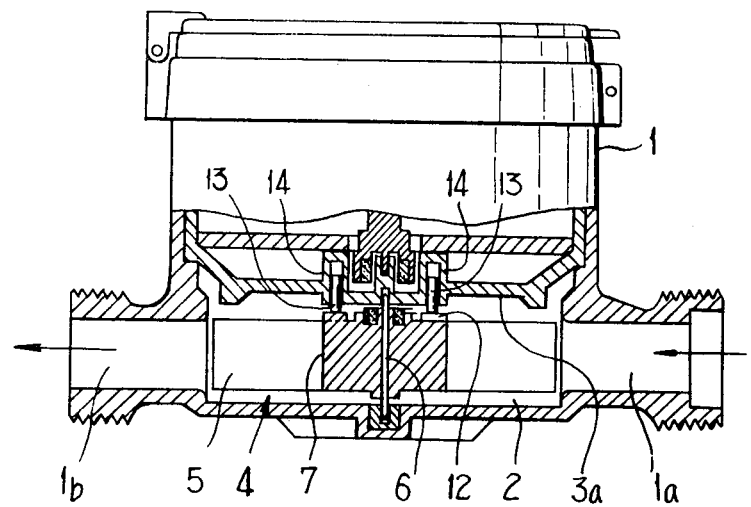
FIGS. 7A and 7B are partial sectional views showing the essential parts of the present invention.
Figure 7B:
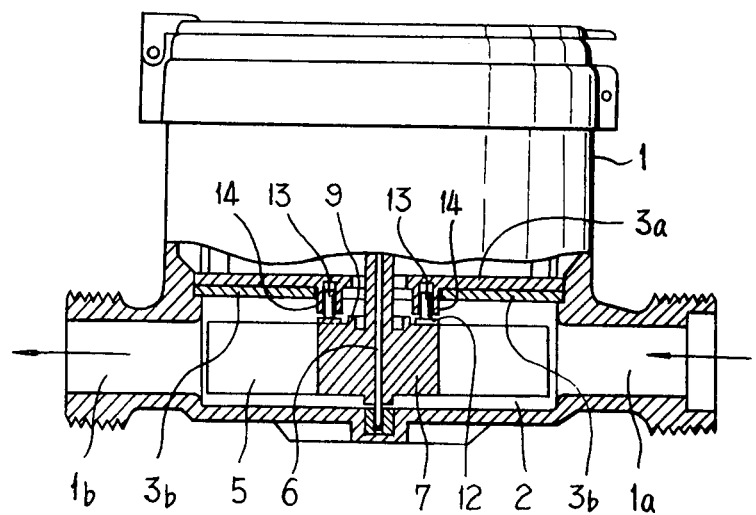

According to the present invention, under the lower plate 3a of the inner housing 3 (dry type) or under the bottom plate 3a (wet type) both located above said vane chamber 2, as shown in FIGS. 7a and 7b respectively there are provided two pin cylinders 14 within which said stop pins 13 will move up and down.

In the above embodiment of the present invention, it is required that the angle of said inclined planes 11 is great enough so that the stop pins 13 can slide smoothly on said inclined planes 11 and the height of said stepped back stops 12 is high enough to be caught by the stop pins 13 when the vane wheel 4 rotates in the reverse direction R2.

The stop pins 13 are made of a light non-rusting metal or hard plastics having a specified weight. The inner walls of said pin cylinders 14 form two cylindrical holes of proper size and depth, so that the stop pins 13 can be moved smoothly up and down within cylindrical holes (not shown in the drawings). The inner walls of said cylindrical holes are machined in such way that said stop pins 13 will not be inclined, thereby not deviating from the center of gravity, and said inner walls of said cylindrical holes will not be covered with fur and fine materials.

In applying the method for forming the stepped back stops 12 and the inclined plane 11 on the upper annular surface 10 of the vane wheel body 7 of the present invention to the prior vane wheel 4, the moulded vane wheel 4 will be ground to form the inclined plane 11 and the back stops 12 on the upper annular plane 10 and in shaping the vane wheel body 7 into a truncate cone as well as in forming the stop pin cylinders 14 under the lower plate 3a (dry type) or under the bottom plate 3a or moulded bearing plate 3b (wet type), it will not be required to add any particular manufacturing process to the existing process except for the back stops 12 and stop pins 13.

As hereinbefore described, the above novel vane wheel type water meter of the present invention not only has a strong and relatively simple construction for preventing the reversion of vane wheel, but also requires a simple process for manufacturing and assembling thereof and eliminates the disadvantage of reducing the integrated counts of the amount of water by the reversion of the vane wheel whereby the production cost will not be substantially increased.

I claim:
1. A vane wheel for a water meter comprising:
a vane wheel body having a longitudinal axis;
several spaced apart vanes extending outwardly from said vane wheel body perpendicular to said axis;
stop means on an upper surface of said vane wheel body for stopping said vane wheel from rotating in a reverse rotational direction relative to an inlet of the water meter; and
said stop means being at least one stepped back stop having a first surface extending perpendicularly upwardly from said upper surface and a second surface annularly inclined gradually downwardly in a normal rotational direction relative to the inlet of the water meter, said normal rotational direction being opposite to said reverse rotational direction.
2. A vane wheel according to claim 1, wherein said stop means includes two stepped back stops, said first surface of each of said stepped back stops being disposed along a straight line passing through said axis.
3. A vane wheel according to claim 1, wherein said vane wheel body has a trancate cone shape with an upper portion of said vane wheel body being greater than a lower portion of said vane wheel body to provide a plurality of fragmental cylindrical surfaces around said vane wheel body, each of said fragmental cylindrical surfaces being downwardly inclined inwardly towards said lower portion of said vane wheel body.
4. A vane wheel water meter comprising:
a meter body provided with a water counter;
a vane chamber located under said meter body and between an inlet and an outlet;
a vane wheel rotatably mounted in said vane chamber for driving the water counter to determine amount of water being supplied;
said vane wheel having a body with a longitudinal axis;

several spaced apart vanes extending outwardly from said vane wheel body perpendicular to said axis;

stop means on an upper surface of said vane wheel body for stopping said vane wheel from rotating in a reverse rotational direction relative to said inlet of the water meter; and said stop means being at least one stepped back stop having a first surface extending perpendicularly upwardly from said upper surface and a second surface annularly inclined gradually downwardly in a normal rotational direction relative to said inlet of the water meter, said normal rotational direction being opposite to said reverse rotational direction.

5. A vane wheel water meter according to claim 4, wherein said meter body includes at least one stop pin mounted within a cylinder located above said vane chamber, said stop pin moving up and down within said cylinder, a lower end of said pin resting on said second inclined surface of said stepped back stop so that said stop pin rides on said second inclined surface of said stepped back stop when said vane wheel rotates in said normal rotational direction, and said stop pin abuts said first perpendicular surface of said stepped back stop to stop said vane wheel from rotating in said reverse rotational direction.

6. A vane wheel water meter according to claim 5, wherein said cylinder is located under a lower plate of an inner housing of said meter body.

7. A vane wheel water meter according to claim 5, wherein said cylinder is located under a bottom plate of said meter body.

8. A vane wheel water meter according to claim 7, wherein said cylinder is located under a bearing plate which is located under said bottom plate.

9. A vane wheel water meter according to claim 5, wherein said stop means includes two stepped back stops and two associated stop pins mounted within two respective cylinders.

10. A vane wheel water meter according to claim 9, wherein said first surface of each of said stepped back stops are disposed along a straight line passing through said axis.

11. A vane wheel water meter according to claim 4, wherein said vane wheel body has a truncate cone shape with an upper portion of said vane wheel body being greater than a lower portion of said wheel body to provide a plurality of fragmental cylindrical surfaces around said vane wheel body, each of said fragmental cylindrical surfaces being downwardly inclined inwardly towards said lower portion of said vane wheel body.

* * * * *